April 16, 1929. F. P. WESTBROOK ET AL 1,709,200
SANITARY MILKING REST
Filed Jan. 17, 1928
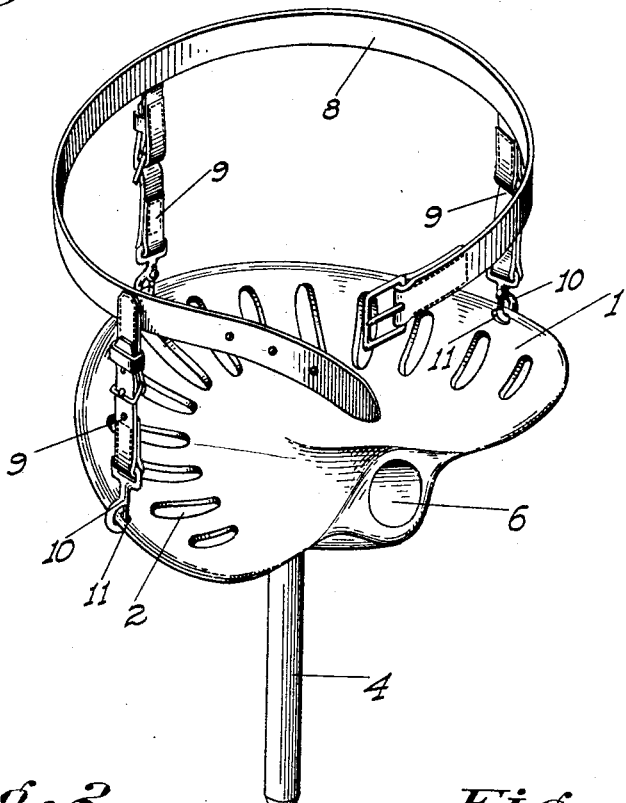
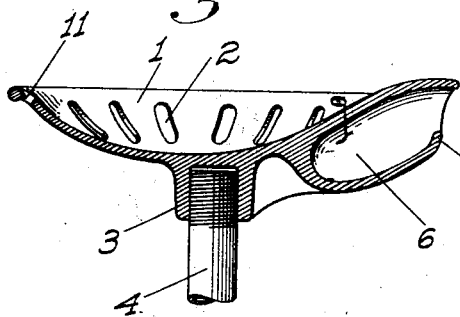
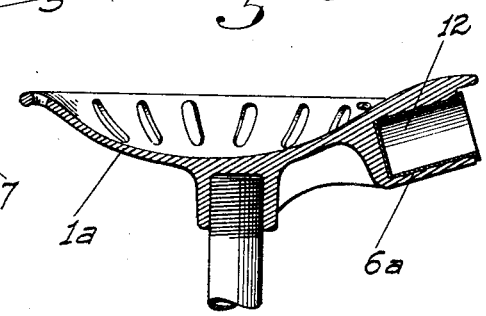
INVENTORS
Fred P. Westbrook and
Manuel P. Bettencourt
BY
ATTORNEY Patented Apr. 16, 1929.

1,709,200

UNITED STATES PATENT OFFICE.

FRED P. WESTBROOK AND MANUEL P. BETTENCOURT, OF MODESTO, CALIFORNIA; SAID BETTENCOURT ASSIGNOR TO SAID WESTBROOK.

SANITARY MILKING REST.

Application filed January 17, 1928. Serial No. 247,362.

This invention relates to improvements in milkers' seats, our principal object being to provide a seat for the purpose adapted to be strapped onto a milker while he moves from one animal to another, which is easily kept in a properly clean condition and sterilized so that the seat is of a very sanitary nature; one which is light so that it will not tire the milker while he is moving around; and which is provided as an integral feature with a cup for the reception of a certain quantity of vaseline or other grease which is positioned so as to be very handy to the milker occupying the seat.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a perspective elevation of our improved seat shown in connection with a belt and strap means.

Fig. 2 is a longitudinal section of the seat.

Fig. 3 is a similar view showing a modified form of grease cup.

Referring now more particularly to the characters of reference on the drawings, and particularly at present to Figs. 1 and 2, 1 denotes the seat, an element of suitable dimensions and of general outline similar to the seats used on various agricultural implements. The seat is slotted as at 2 or otherwise perforated to lessen the weight and is preferably made of duralumin metal which is light yet strong. The under surface of the seat is provided with a downwardly projecting centrally disposed boss or socket 3 tapped to detachably receive the upper end of a threaded leg 4 which is pointed on its lower end as at 5. Ahead of the boss the underside of the seat is formed with a longitudinally disposed pocket 6 which extends to the forward edge of the seat at its center of width and has a downward slant towards its inner end. This pocket is open at its front end, the size of the mouth being sufficient to freely receive a finger therethrough. The pocket is preferably formed with an upwardly projecting lip 7 across the bottom of the mouth, so as to better hold grease and the like placed in the bottom.

To enable the seat to be detachably strapped to the milker, we provide a belt 8 to be detachably placed around his waist. From this belt, straps 9 of adjustable length depend, these straps having snap hooks 10 or the like on their lower ends to detachably engage slots or eyes 11 formed in the seat at spaced intervals adjacent its rim.

In the type of seat shown in Fig. 3 the general construction and shape is the same but the pocket 6ª under the seat 1ª is not for the direct reception of grease, but to form a support for a removable grease cup 12 which is open at the forward end of the seat and is removable from such end. By means of this arrangement the cup with any grease left therein may be easily removed when it is desired to wash and sterilize the seat without any loss of grease being had.

In operation the milker first dons the belt and connects the straps to the seat, adjusting their length to suit his individual requirements. The point of the leg rests on the floor or ground and prevents slipping of the seat. The grease pocket being in front of the seat, it is conveniently positioned for the milker to insert his finger and remove any amount of grease that he may require during the milking operations.

The seat being of metal and free from all sharp corners, it may be easily kept clean by means of steam or other sterilizing agent without damage. The leg being removable, makes the structure more handy to clean and more compact for shipping and storing.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A milker's seat comprising a seat member, and a pocket extending lengthwise of and immediately under the seat from the forward end thereof and open at such end.

2. A milker's seat including a seat member, and a longitudinally extending and substantially cylindrical pocket formed with and projecting rearwardly from the front edge of the seat member and permanently open to said edge.

3. A milker's seat including a seat member, and a longitudinally extending pocket formed with and projecting rearwardly from the front edge of the seat and open to said edge, said pocket having a downward slope from front to rear.

4. A milker's seat including a seat member, a longitudinally extending pocket formed with and projecting rearwardly from the front edge of the seat and open to said edge, and a transverse upstanding lip across the bottom of the pocket.

In testimony whereof we affix our signatures.

FRED P. WESTBROOK.
MANUEL P. BETTENCOURT.